US010294859B2

(12) United States Patent
Melde-Tuczai et al.

(10) Patent No.: US 10,294,859 B2
(45) Date of Patent: May 21, 2019

(54) LENGTH-ADJUSTABLE CONNECTING ROD

(71) Applicant: AVL LIST GMBH, Graz (AT)

(72) Inventors: Helmut Melde-Tuczai, Graz (AT);
Stefan Lichtenegger, St. Stefan (AT);
Bernhard Hoedl, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 15/028,638

(22) PCT Filed: Oct. 13, 2014

(86) PCT No.: PCT/EP2014/071890
§ 371 (c)(1),
(2) Date: Apr. 11, 2016

(87) PCT Pub. No.: WO2015/055582
PCT Pub. Date: Apr. 23, 2015

(65) Prior Publication Data
US 2016/0237889 A1    Aug. 18, 2016

(30) Foreign Application Priority Data

Oct. 18, 2013  (AT) .................................. 50674/2013

(51) Int. Cl.
F02B 75/04        (2006.01)
F16C 7/06         (2006.01)
(Continued)

(52) U.S. Cl.
CPC .............. *F02B 75/045* (2013.01); *F02F 1/00* (2013.01); *F02F 3/00* (2013.01); *F16C 7/06* (2013.01)

(58) Field of Classification Search
CPC ....... F02F 1/00; F02F 3/00; F16C 7/06; F02B 75/045
See application file for complete search history.

(56) References Cited

U.S. PATENT DOCUMENTS 1,610,137 A * 12/1926 Kratsch ..................... F16C 7/04
                                                    123/78 E
2,134,995 A   11/1938 Anderson
(Continued)

FOREIGN PATENT DOCUMENTS

DE         2161580        7/1973
DE         8429462        2/1985
(Continued)

OTHER PUBLICATIONS

English Abstract of FR 2857408.
(Continued)

*Primary Examiner* — Vicky A Johnson
(74) *Attorney, Agent, or Firm* — Sheridan Ross P.C

(57) ABSTRACT

The invention relates to a length-adjustable connecting rod (1) for a reciprocating-piston machine, in particular for an internal combustion engine, comprising at least one first rod part (6) having a small connecting rod eye (2) and a second rod part (9) having a large connecting rod eye (4), which two rod parts can be moved in relation to each other and/or in each other in a telescopic manner, wherein the second rod part forms a guiding cylinder (8) and the first rod part forms a piston element (7) that can be longitudinally displaced in the guiding cylinder, wherein a first high-pressure chamber (10) is spanned between the second rod part and the piston element on the side of the piston element facing the large connecting rod eye, into which first high-pressure chamber at least one first oil channel (20) leads, in which in particular a first check valve (21) opening in the direction of the first high-pressure chamber is arranged, wherein at least a first return channel (22) extends from the first high-pressure chamber, an outflow cross-section of which return channel can be closed by a control valve (13) in a first position and can be opened by the control valve in a second position, wherein the control valve preferably has a control piston (Continued)

(15) that can be axially displaced in an accommodating bore (14) of the second rod part of the connecting rod, which control piston in particular can be moved into the first position by means of a return spring (16) and can be moved into the second position against the force of the return spring by means of an actuating force. In order to be able to change the compression ratio as simply possible, the piston element according to the invention is designed as a piston that is operative at both ends.

20 Claims, 5 Drawing Sheets

(51) Int. Cl.
*F02F 1/00* (2006.01)
*F02F 3/00* (2006.01)

(56) References Cited

U.S. PATENT DOCUMENTS

| | | | |
|---|---|---|---|
| 2,217,721 A | 10/1940 | Anthony | |
| 2,989,954 A | 6/1961 | Hulbert | |
| 4,124,002 A | 11/1978 | Crise | |
| 4,140,091 A * | 2/1979 | Showers, Jr. | F02B 75/045 123/78 BA |
| 4,195,601 A | 4/1980 | Crise | |
| 5,724,863 A * | 3/1998 | Kramer | F02B 41/04 123/48 R |
| 6,604,496 B2 * | 8/2003 | Bartsch | F02B 75/045 123/78 E |
| 9,528,546 B2 * | 12/2016 | Melde-Tuczai | F02B 75/045 |
| 9,670,952 B2 * | 6/2017 | Melde-Tuczai | F02B 75/045 |

FOREIGN PATENT DOCUMENTS

| | | |
|---|---|---|
| DE | 3507327 | 9/1986 |
| DE | 4226361 | 4/1994 |
| DE | 19612721 | 10/1996 |
| DE | 19835146 | 6/1999 |
| FR | 2857408 | 1/2005 |
| GB | 2161580 | 1/1986 |
| JP | 2010-112286 | 5/2010 |
| WO | 0210568 | 2/2002 |

OTHER PUBLICATIONS

English Abstract of DE 19835146.
English Abstract of DE 19612721.
English Abstract of DE 4226361.
English Abstract DE 2161580.
Official Action for Austria Patent Application No. A 50674/2013, dated Feb. 19, 2014, 3 pages.
Official Action for European Patent Application No. 14789207.9, dated Sep. 20, 2017, 15 pages.
English Translation Official Action for China Patent Application No. 201480068098.2, dated Nov. 8, 2017, 4 pages.

* cited by examiner

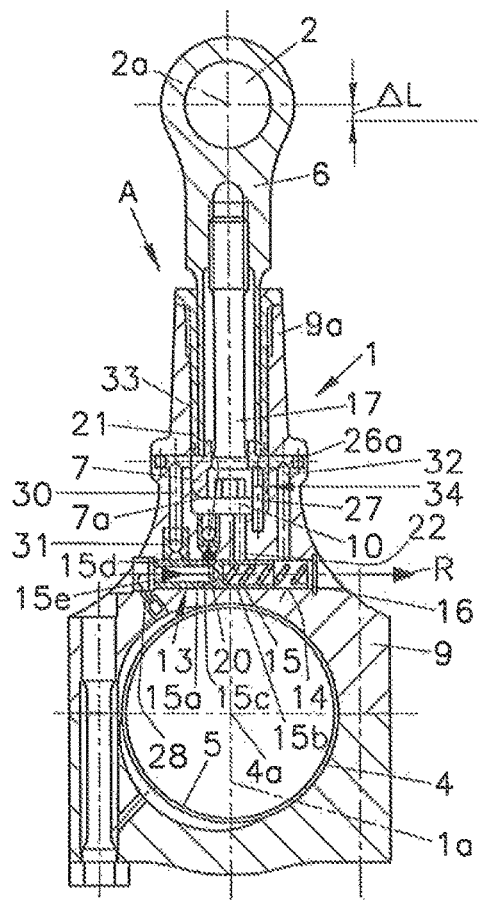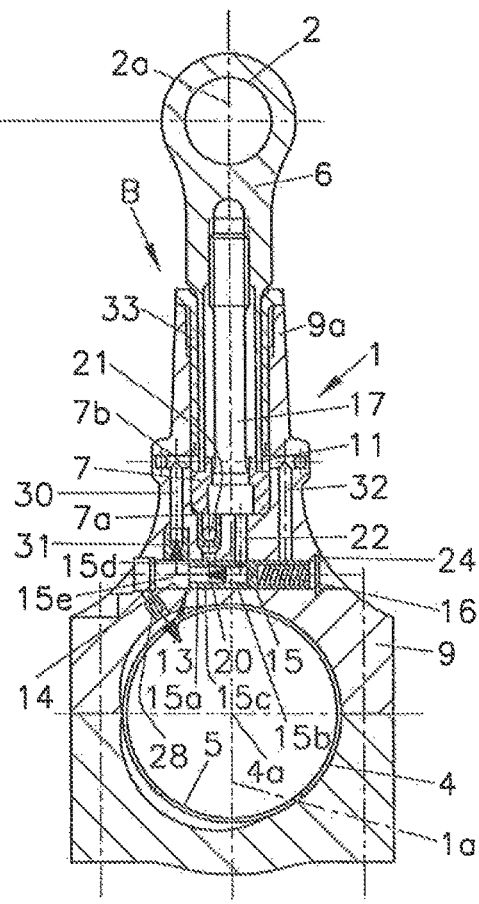
Fig.10    Fig.11
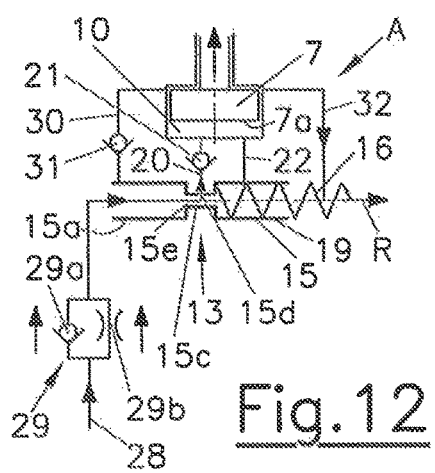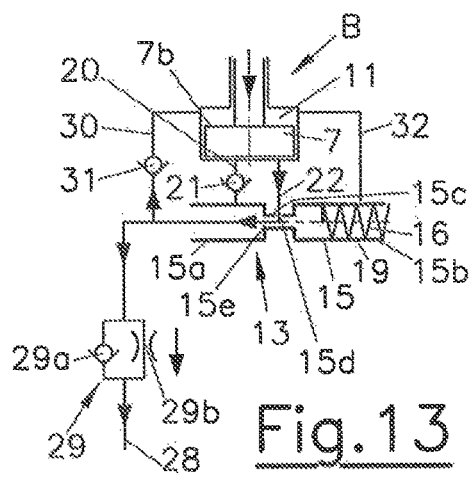
Fig.12    Fig.13 ns that are complex to machine are used. The ascertainment of the optimum wedge angle for the respective application requires additional development work.

LENGTH-ADJUSTABLE CONNECTING ROD

BACKGROUND OF THE INVENTION

Field of the Invention

The invention relates to a length-adjustable connecting rod for a reciprocating piston machine, in particular for an internal combustion engine, comprising at least one first rod part having a small connecting rod eye and a second rod part having a large connecting rod eye, which two rod parts can be moved in relation to each other and/or in each other in a telescopic manner, wherein the second rod part forms a guiding cylinder and the first rod part forms a piston element that can be longitudinally displaced in the guiding cylinder, wherein a first high-pressure chamber is spanned between the second rod part and the piston element on the side of the piston element facing the large connecting rod eye, into which first high-pressure chamber at least one first oil channel leads, in which in particular a first check valve opening in the direction of the first high-pressure chamber is arranged, wherein at least a first return channel extends from the first high-pressure chamber, an outflow cross section of which return channel can be closed by a control valve in a first position and can be opened by the control valve and a second position, wherein the control valve preferably has a control piston that can be axially displaced in an accommodating bore of the second rod part of the connecting rod, which control piston in particular can be moved into the first position by means of a return spring and can be moved into the second position against the force of the return spring by means of an actuating force.

The Prior Art

By changing the compression of an internal combustion engine, full load can be run at lower compression ratio, and part load and starting can be run at increased ratio. In this case, the consumption is improved in the part load range, the compression pressure is increased during the starting using the increased compression ratio, and the peak pressure is reduced at high power with reduced ratio, and also knocking is prevented.

Using an eccentric piston pin or an eccentric crank pin of the crankshaft for adjusting the compression ratio is known. Furthermore, raising the entire cylinder block or lowering the entire crankshaft bearing using eccentric mounting thereof in the crankcase is known for changing the compression ratio.

U.S. Pat. No. 2,217,721 A discloses an internal combustion engine having a length-adjustable connecting rod having a first and a second rod part, which rod parts can be moved in relation to each other and/or in each other in a telescopic manner. A high-pressure chamber is spanned between the two rod parts, into which an oil channel leads. For refilling and emptying the high-pressure chamber using oil and therefore for the length adjustment of the connecting rod, a control valve having a closure part element which can be axially displaced is provided, which can be moved into a first closed position by means of a return spring and can be moved into a second open position, against the force of the return spring, by oil pressure.

Further connecting rods, each having a hydraulic telescopic mechanism for adjusting the rod length, are known from FR 2 857 408 A1, WO 02/10568 A1, DE 198 35 146 A1, U.S. Pat. Nos. 4,195,601 A, 4,124,002 A, and 2,134,995 A.

WO 2013/092364 A1 describes a length-adjustable connecting rod for an internal combustion engine comprising a first rod part and a second rod part. The two rod parts can be moved in relation to one another and/or in each other in a telescopic manner, wherein the second rod part forms a guide cylinder and the first rod part forms a piston element, which can be moved longitudinally in the guide cylinder. A first high-pressure chamber is spanned between the first rod part and the second rod part, into which at least one first oil channel leads. The inflow to the oil channel can be controlled via a control piston, which can be displaced axially in a accommodating bore. The control piston is moved into a first position by means of a return spring and into a second position, against the force of the return spring, by oil pressure.

AT 512 334 A1 discloses a similar length-adjustable connecting rod comprising rod parts which can be moved in a telescopic manner, wherein the rod parts can be locked mechanically by a locking unit in at least one moved position. The locking unit has a slide in this case, which can be moved in a accommodating bore of a rod part, transversely to the longitudinal axis of the connecting rod, between a locked position and a release position. The slide has a wedge-shaped region in this case, which interacts with a corresponding wedge-shaped region of the other rod part. The deflection of the slide is performed hydraulically by applying pressure to an end face of the slide against the force of a return spring.

It is disadvantageous that the locking unit occupies a relatively large amount of structural space. Furthermore, it is disadvantageous that a relatively large number of components which are complex to machine are used. The ascertainment of the optimum wedge angle for the respective application requires additional development work.

All known proposals therefore require a high level of design and/or control expenditure.

The object of the invention is to avoid these disadvantages and provide a simple solution for changing the compression ratio.

SUMMARY OF THE INVENTION

This is achieved according to the invention in that the piston element is designed as a double acting piston, preferably as a stepped piston.

A piston that is operable at both ends is, in the present use, a piston to which oil can be applied or which is hydraulically operable on opposing ends, and thus can exert force in two directions.

A stepped piston is a piston having active areas of different sizes, wherein one of the active areas is designed as a ring area and the other active area is designed as a circular area, for example.

Both in the extended position, which is associated with the first position of the control valve, and also in the retracted position, which is associated with the second position of the control valve, the first rod part can be hydraulically locked in relation to the second rod part.

It is preferably provided that, on the end of the piston element facing toward the small connecting rod, a second high-pressure chamber is spanned between a holding part, which is fixedly connected to the second rod part, and the piston element, into which at least one second oil channel leads, in which a second check valve, which preferably opens in the direction of the first high-pressure chamber, is arranged. To enable a depressurization, at least one return channel can originate from the second high-pressure chamber, the outflow cross section of which can be closed by the control valve in the second position and can be opened in the first position. The first and second high-pressure chambers fix the position in the direction of the large rod eye or in the direction of the small rod eye, respectively.

It is particularly advantageous if a return flow throttle, which opens in the direction of the control valve, is arranged in a feed line to the control valve, which preferably originates from the large rod eye.

The return flow throttle can consist of a check valve, which opens in the direction of the control valve, and a throttle bore arranged in parallel thereto, wherein the return flow throttle can have, for example, a spring-loaded valve plate provided with a throttle bore, which is pressed onto a valve seat opposite to the opening direction by means of a valve spring. A return flow throttle of this type is disclosed, for example, in DE 196 12 721 A1.

On the one hand, rapid filling of the high-pressure chambers can be performed by means of the return flow throttle via the opening check valve of the return flow throttle. On the other hand, the returning pressure waves resulting from the adjustment of the connecting rod are damped and the return flow in the direction of the large rod eye is kept small.

The pressure oil supply of the high-pressure chambers is performed via the inflow line from the large rod eye or the large rod bearing of the connecting rod.

The axis of the accommodating bore of the control piston of the control valve is preferably arranged perpendicularly to the rod longitudinal axis in the longitudinal center plane of the connecting rod. To enable simple manufacturing of the second oil channel and the second return channel, it is advantageous if the second oil channel and/or the second return channel are arranged outside a longitudinal center plane of the connecting rod, which encloses the rod longitudinal axis—and therefore laterally adjacent to the accommodating bore. The connection between the lateral second oil and return channels and the accommodating bore is produced via short transverse bores. The first oil channel and the first return channel can be arranged in the longitudinal center plane.

The second oil and return channels can be drilled extending from the large rod eye of the connecting rod. The production of the first oil and return channels can be performed from the side of the guide cylinder.

A reliable and simple solution for the change of the compression ratio can be implemented if the feed cross section to the first oil channel can be closed in the second position and can be opened in the first position by means of the control valve, wherein preferably the feed cross section to the second oil channel can be closed in the first position and opened in the second position by means of the control valve.

In one particularly simple embodiment variant of the invention, which has an extraordinarily compact construction, it is provided that only the first and second return channels can be controlled by means of the control valve. The control piston can thus be kept very short.

The actuation of the control piston is preferably performed hydraulically by means of oil pressure against the force of a return spring.

Alternatively or additionally, it can be provided that the actuation of the control piston is performed electromagnetically, wherein preferably the control piston consists of ferromagnetic material or has a permanent magnet element, which interacts with an induction coil arranged in the crankcase. The control piston can be locked in at least one position by means of at least one locking element, which is preferably formed by a spring-loaded pressure part, wherein preferably the locking element has a spring-loaded pressure body, which acts on the control piston transversely to the movement direction thereof.

BRIEF DESCRIPTION OF THE DRAWINGS

The invention will be explained in greater detail hereafter on the basis of the figures. In the figures:

FIG. 10 shows a connecting rod according to the invention, in a section similar to FIG. 1, in a second embodiment variant in a first switching position of the switching valve having the second oil and return channels rotated into the plane of section;

FIG. 11 shows this connecting rod in a second switching position of the switching valve;

FIG. 12 shows a switching arrangement for the first switching position of the control valve shown in FIG. 10 in a schematic illustration;

FIG. 13 shows a switching arrangement for the second switching position of the control valve shown in FIG. 11 in a schematic illustration.

DETAILED DESCRIPTION OF THE DEPICTED EMBODIMENTS

Functionally equivalent parts are provided with identical reference signs in the embodiment variants.

Figures 1, 2, 3:
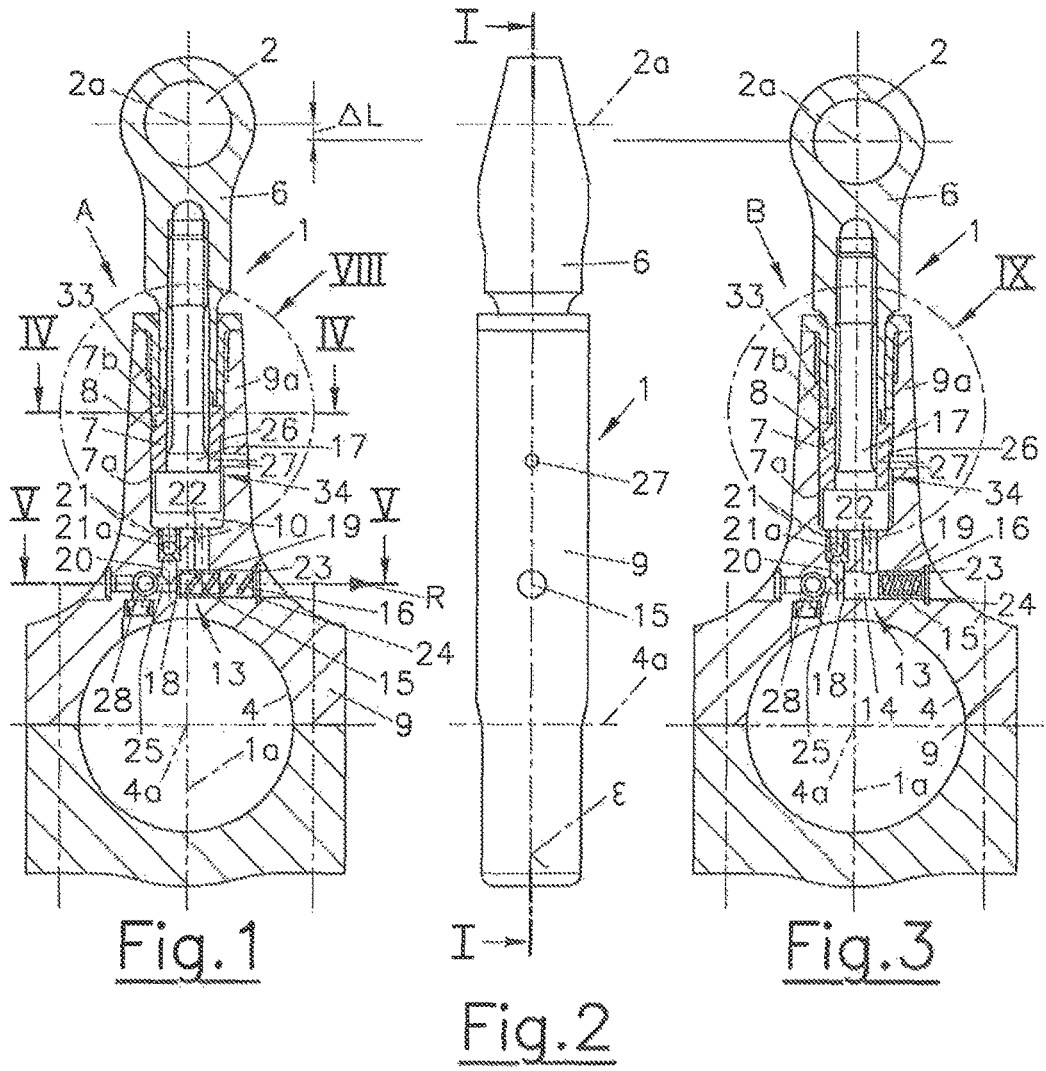
FIG. 1 shows a connecting rod according to the invention in a section along line I-I in FIG. 2 in a first embodiment variant in a first switching position of the switching valve.
FIG. 2 shows this connecting rod in a side view.
FIG. 3 shows the connecting rod in a section similar to FIG. 1 in a second switching position of the switching valve.
Figure 4:
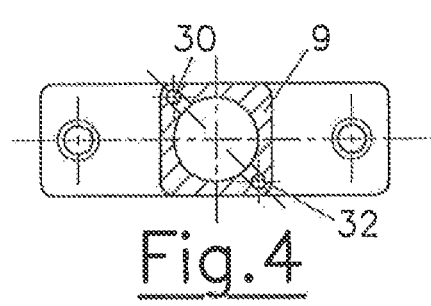
FIG. 4 shows the connecting rod in a section along line IV-IV in FIG. 1.
Figure 5:
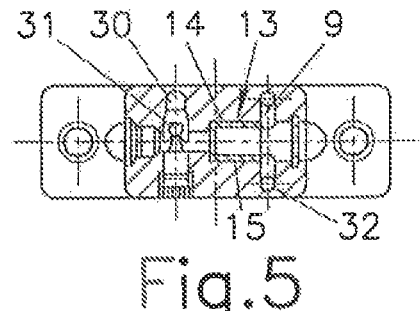
FIG. 5 shows the connecting rod in a section along line V-V in FIG. 1.
Figure 8:
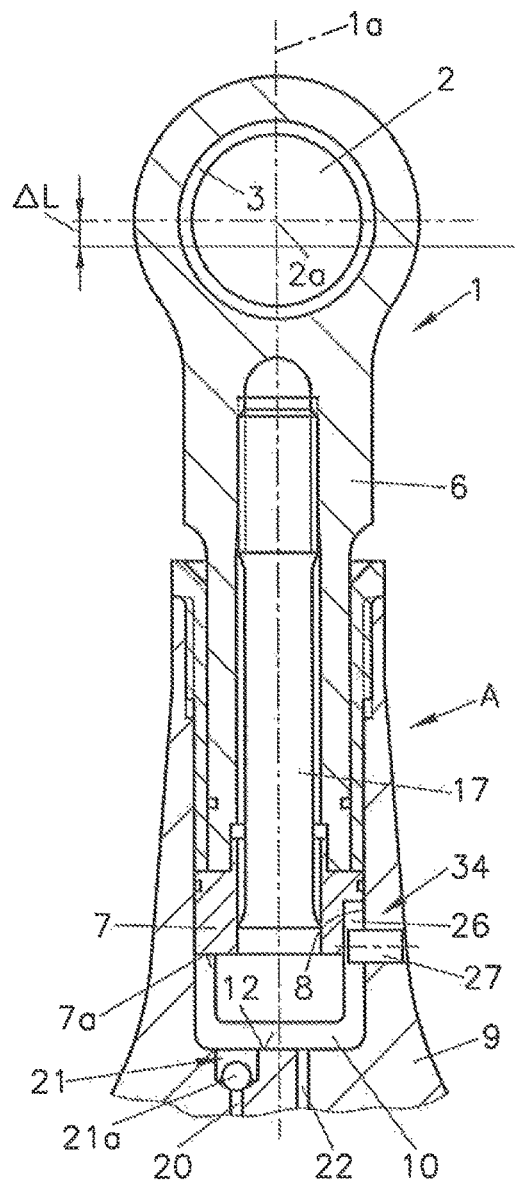
FIG. 8 shows detail VIII from FIG. 1.
Figure 9:
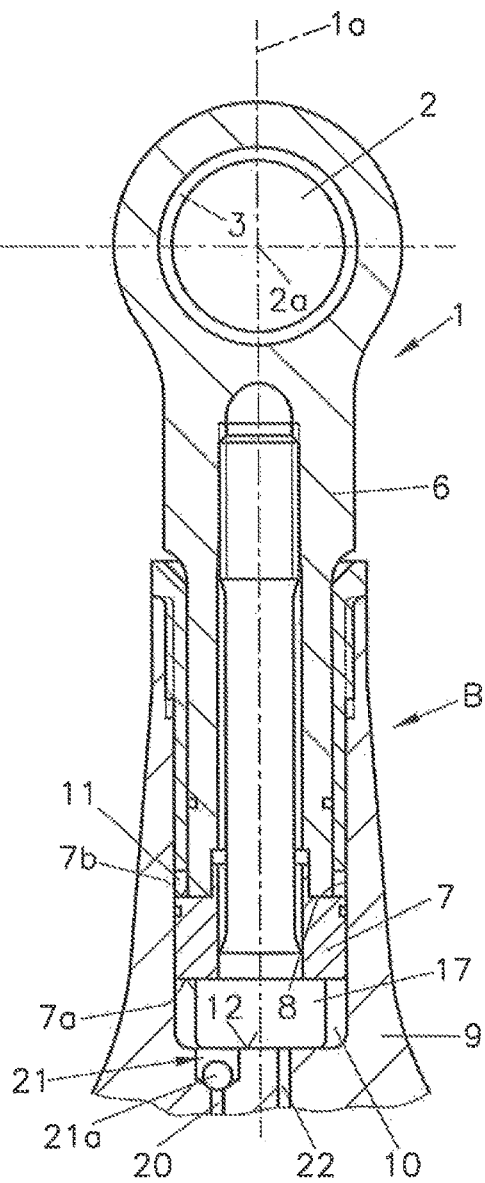
FIG. 9 shows detail IX from FIG. 3.

In each of the figures, a two-part connecting rod 1, comprising a small rod eye 2 for a piston pin bearing 3, which is visible in FIG. 8, and a large rod eye 4 for a crank pin bearing 5 (see FIG. 10 and FIG. 11) of an internal combustion engine is shown. The axes of rotational symmetry of the small and large rod eyes 2, 4 are identified with 2a and 4a, respectively. The longitudinal axis of the connecting rod 1 is identified with 1a, and a longitudinal center plane of the connecting rod 1, which is perpendicular to the axes of rotational symmetry 2a and 4a of the small and large rod eyes 2, 4 and includes the longitudinal axis 1a of the connecting rod 1, is identified with ε (FIG. 2).

The connecting rod 1 has an upper first rod part 6 having the small rod eye 2 and a lower second rod part 9 having the large rod eye 4. The first rod part 6 can be adjusted in relation to the second rod part 9 between an extended position A (FIG. 1, FIG. 6, FIG. 8, FIG. 10, and FIG. 12) and a retracted position B (FIG. 3, FIG. 7, FIG. 9, FIG. 11, and FIG. 13) by an adjustment range ΔL, which is visible in FIG.

1, FIG. 8, and FIG. 10, in the direction of the longitudinal axis 1a of the connecting rod 1. A substantially cylindrical piston element 7 having a fastening screw 17, which is formed in the exemplary embodiments by a hexagon socket screw, is fastened in the upper first rod part 6. In the embodiment variant shown in FIG. 1 and FIG. 3, the screw head of the fastening screws 17 protrudes from the piston part 7, in the second embodiment variant shown in FIG. 10 in FIG. 11, the screw head is countersunk in the piston part 7.

The piston element 7 is guided in a guide cylinder 8 of the lower second rod part 9 of the connecting rod 1 so it can be moved axially, wherein a first high-pressure chamber 10 is spanned between a first end face 7a of the piston element 7, which faces toward the large rod eye 4, and the second rod part 9 in at least one position of the two rod parts 6, 9. As is apparent from FIG. 1 and FIG. 3, in the first exemplary embodiment, the screw head of the fastening screw 17 protrudes from the first end face 7a of the piston element 7 into the first high-pressure chamber 10, which has no influence on the function, however, since only the projection of the active area in the axial direction is relevant. The active area of the piston element 7 oriented toward the first high-pressure chamber 10 is partially formed by the first end face 7a and partially by the end face of the screw head of the fastening screw 17. The piston element 7, which is designed as a stepped piston, has a second end face 7b, which faces toward the small rod eye 2, and which borders on a second high-pressure chamber 11, the cylindrical lateral surface of which is formed by the guide cylinder 8 of the second rod part 9. A stepped piston is generally understood as a piston— in the present case a "piston that is operative at both ends"—having active areas of different sizes, wherein one of the active areas (here: the active area oriented toward the second high-pressure chamber 11) is designed as a ring area and the other active area is designed as a circular area. The pressure ratios described here may be implemented by the different active areas.

The ring-shaped first and second end faces 7a, 7b form pressure engagement areas for an actuating medium, which is conducted into the high-pressure chambers 10, 11 and is pressurized, for example, motor oil.

Motor oil is applied to the first end face 7a of the piston element 7, which borders the first high-pressure chamber 10, via the first oil channel 20, in which a first check valve 21, which opens in the direction of the first high-pressure chamber 10, is arranged. A first return channel 22, via which the first high-pressure chamber 10 can be depressurized, extends from the first high-pressure chamber 10.

A second oil channel 30, in which a second check valve 31, which opens in the direction of the second high-pressure chamber 11, is arranged, leads into the second high-pressure chamber 11, which borders the second end face 7b of the piston element 7. Oil pressure can be applied to the second high-pressure chamber 11 via this second oil channel. The depressurizing of the second high-pressure chamber 11 takes place via a second return channel 32 extending from the second high-pressure chamber 11.

The oil feed, blocking, and discharge of the oil is controlled by a control valve 13, which has a control piston 15, which can be moved axially in a accommodating bore 14 between a first position and a second position, and which is controlled in a known manner via the oil pressure at the oil pump (not shown in greater detail) by means of a pressure regulating valve (also not shown), wherein, for example, an actuator (not shown) pre-tensions a spring in the regulating valve of the oil pump more or less.

By moving the control piston 15, either the first or the second return channel 22, 32 can be opened or blocked, wherein the respective other return channel 32, 22 is blocked or opened, respectively.

In the first embodiment variant shown in FIG. 1 to FIG. 9, the control piston 15 only opens or closes the first and second return channels 22 and 32. The first and second oil channels 20, 30 are not controlled by the control piston 15.

In contrast, the control piston 15 in the embodiment shown in FIG. 10 to FIG. 12 has a first piston part 15a for activating the first and second oil channels 20, 30 and a second piston part 15b for activating the first and second return channels 22, 32, wherein a radial bore 15d, which is preferably arranged in a ring groove 15c, is formed into the control piston 15 between the two piston parts 15a, 15d, this bore opening into an axial bore 15e of the control piston 15. The axial bore 15e is designed as open in the direction of the oil supply channel 28, which extends from the large rod eye 4 or the crank pin bearing 5 and leads into the accommodating bore 14.

Figure 6:
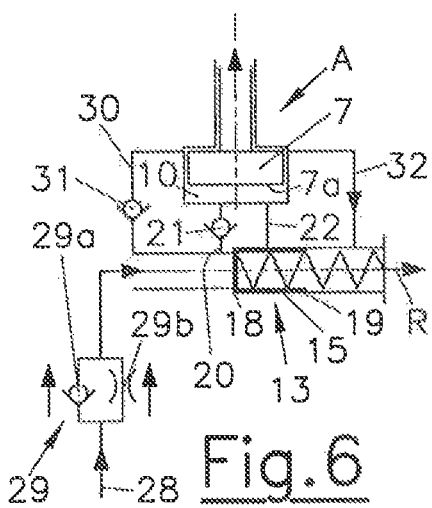
FIG. 6 shows a switching arrangement for the first switching position of the control valve shown in FIG. 1 in a schematic illustration.
Figure 7:
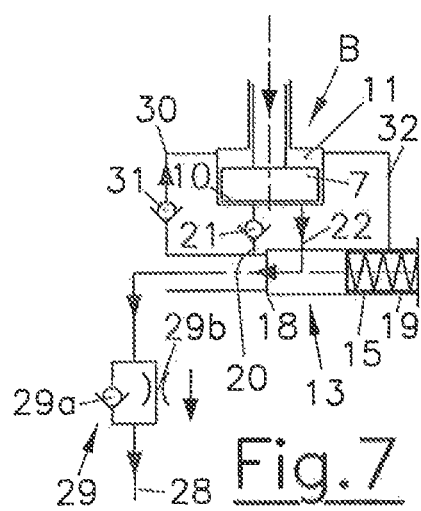
FIG. 7 shows a switching arrangement for the second switching position of the control valve shown in FIG. 3 in a schematic illustration.

FIG. 1 shows a connecting rod 1 in a first embodiment variant in an extended position A, which is associated with a high compression ratio, and which is correlated with the first position of the control valve 13 schematically shown in FIG. 6, and FIG. 3 shows the connecting rod 1 in a retracted position B, which is associated with a low compression ratio, and which is correlated with a second position of the control valve 13 visible in FIG. 7.

FIG. 10 shows a connecting rod 1, which has a high compression ratio, in a second embodiment variant comprising second oil and return channels 30, 32, which are rotated into the plane of section, in an extended position A, which is associated with a high compression ratio and is correlated with the first position of the control valve 13 shown in FIG. 12. FIG. 11 also has the second oil and return channels 30, 32, which are rotated into the plane of section, and shows the connecting rod from FIG. 10 in a retracted position B, which is associated with a low compression ratio and is correlated with a second position of the control valve 13 shown in FIG. 13.

At low load, the oil pressure is regulated to low pressure, for example, to 1.8 bar, by the oil pump in a manner dependent on speed and load. The control piston 15 is pressed in this case—as shown in FIG. 1 and FIG. 6, for example—in its accommodating bore 14, which is arranged transversely to the longitudinal axis 1a of the connecting rod 1, against a first stop 18 by the force of the return spring 16 at low oil pressure level, since the spring force of the return spring 16 is greater than the piston force of the control piston 15 caused by the oil pressure. In this position, a flow connection results between the oil supply from the crank pin bearing 5 and the first check valve 21, which leads into the first high-pressure chamber 10 located below the first end face 7a of the piston element 7. As long as the piston of the internal combustion engine pulls apart the two connecting rod parts 6, 9 by means of its mass force, oil flows through the first check valve 21 into the first high-pressure chamber 10 until it is filled. The volume of the high-pressure chamber 10 is delimited by a holding part 33, which is screwed into the shaft part 9a of the second rod part 9 and is formed by a stop sleeve, and which defines the maximum possible stroke of the piston element 7. Depending on the length of this stop sleeve, the adjustment range ΔL of the connecting rod of the length-adjustable connecting rod 1 may be set arbitrarily.

The motor oil is suctioned by the mass force via the first check valve 21 arranged in the first oil channel 20 below the first end face 7a of the piston element 7. The control piston 15 blocks, with its cylinder jacket 19, the first return channel 22 extending from the first high-pressure chamber 10. The suctioned-in oil cannot escape and is not compressible. As a result, the piston element 7, including the first rod part 6, is raised and the connecting rod 1 therefore becomes longer. In this manner, a higher compression ratio can be set at low oil pressure.

As the connecting rod 1 is pulled apart, the piston element 7 displaces the oil outlet of the ring-shaped second high-pressure chamber 11 via the second return channel 32, which the control piston 15 of the control valve 13 releases in this first position. The oil flows toward the crankcase of the internal combustion engine according to the arrow R shown in FIG. 1, FIG. 6, FIG. 10, and FIG. 12.

If the regulating pressure of the oil pump is regulated to a higher level, for example, to 3.5 bar, at higher load—also in a manner dependent on load and speed—the control piston 15, as shown in FIG. 3 and FIG. 11, is pressed in its accommodating bore 14 against the second stop 23 by the motor oil, since the piston force of the control piston 15 caused by the oil pressure is stronger than the spring force of the return spring 16. The return spring 16 is compressed in this case. The second stop 23 can be formed, for example, by a guide for the return spring 16 and/or a lock ring 24 inserted into a groove of the accommodating bore 14.

In this position, a flow connection results between the first high-pressure chamber 10 and the second check valve 31, which is arranged in the second oil channel 32 leading to the second high-pressure chamber 11. The gas force presses the first rod part 6, including the piston element 7, downward in the figure in the direction of the large rod eye 4, because the outflow from the first high-pressure chamber 10 through the first return channel 22 was opened by the control piston 15. The pressure arising due to the gas force in this first high-pressure chamber 10, which can reach approximately 20 times the amount of the gas pressure in the combustion chamber, now helps to fill the ring-shaped second high-pressure chamber 11. The outflow through the second return channel 32 from this second high-pressure chamber 11 is blocked by the control piston 15 in this second position. In this second position, the gas pressure from the combustion chamber (not shown in greater detail) presses the piston element 7 entirely downward, whereby a smaller compression ratio results. Due to the resulting pressure, the first rod part 6 of the connecting rod 1 is pressed downward in the figure in the direction of the large rod eye 4 against the piston-side end face 12 of the guide cylinder 8, which forms a stop for the piston element 7 in the retracted position of the first rod part 6.

The piston element 7 can no longer lift up, because oil reaches the second high-pressure chamber 11 through the second check valve 31, which is continuously open for the filling of the second high-pressure chamber 11, and the piston element 7 thus furthermore remains pressed against the bottom of the pocket hole. The first check valve 21 is held in its closed position by the rising pressure in the first high-pressure chamber 10.

In the second embodiment variant, the first oil channel 20 is additionally also blocked by the left piston part 15a in FIG. 13.

Since the volume of the second high-pressure chamber 11 is smaller than the volume of the first high-pressure chamber 10, the oil which no longer has space in the second high-pressure chamber 11 has to be able to flow out via the feed line 25, which has a return flow throttle 29, and which has an oil supply channel 28 leading into the large rod eye, in the direction of the crank pin bearing 5. This is achieved in that, in the second position of the positioning rod 15, the first return channel 22 for the motor oil is opened by the control piston 15, as is visible from FIG. 7 and FIG. 13.

It is particularly advantageous that, even in a lower idle range of the internal combustion engine, when the engine oil pressure is lower than the regulating pressure, a higher compression ratio can be set, which improves the consumption in the low load range and makes cold starting easier. To maintain the high compression ratio over a longer time, the leakage losses due to the clearance of the guide cylinder 8 from the first high-pressure chamber 10 must be refilled therein below the first end face 7a of the piston element 7. This is performed in that the mass force of the piston (not shown in greater detail) and the first rod part 6 suctions in the engine oil through the feed line 25 via the first check valve 21 (refilling valve) into the first high-pressure chamber 10 below the first end face 7a. During the subsequent compression stroke, the high pressure builds up again and the small ball 21a in the first check valve 21 prevents the escape of the oil from the first high-pressure chamber 10. This procedure repeats during each work cycle. If one wishes to reduce the compression ratio again, the regulating pressure of the oil pump is increased and the control piston 15 is pressed by the oil pressure against the second stop 23 and the flow connection between the first return channel 22 via the feed line 25 and the oil supply channel 28 to the crank pin bearing 5 is therefore opened. The gas pressure presses the piston element 7 downward and the lower compression ratio is set again. The control piston 15 is pushed back and forth in its accommodating bore 14 only by the oil pressure and by the return spring 16 between the stops 18 at low oil pressure and 23 at high oil pressure.

The piston element 7 has an anti-rotation element 34, which is formed in the first exemplary embodiment (see FIG. 1 and FIG. 2) by an axial groove 26 formed in its lateral surface, in which a cylindrical pin 27 engages. "Axially" means substantially parallel to the longitudinal axis is of the connecting rod 1 here, while in contrast the cylindrical pin 27 engages radially, i.e., substantially perpendicularly to said longitudinal axis 1a, in the axial groove 26. In the second embodiment variant (see FIG. 10 and FIG. 11), the anti-rotation element 34 has an axial bore 26a in the first end face 7a of the piston element 7, in which a cylindrical pin 27 arranged correspondingly in the second rod part 9 engages, the length of which engaging in the bore 26a is greater than the adjustment path ΔL.

The pin 27 prevents rotation of the piston element 7 and therefore of the first rod part 6 in relation to the second rod part 9.

The oil supply of the accommodating bore 14 of the control piston 15 is performed via the feed line 25 and the oil supply channel 28. It opens into the large rod eye 4 and therefore has a flow connection to the crank pin bearing 5.

The return flow throttle 29 arranged in the oil supply channel 28 consists of a check valve 29a, which opens in the direction of the control valve 13, and a throttle bore 29b arranged parallel thereto, wherein the return flow throttle 29 can have—as known per se—a spring-loaded valve plate provided with a throttle bore, for example, which is pressed by a valve spring onto a valve seat opposite to the opening direction (not shown in greater detail). Rapid filling of the first high-pressure chamber 10 can be ensured by the check valve 29a of the return flow throttle opening in the direction of the switching valve 13. On the other hand, the pressure waves which result from the adjustment of the two rod parts 6, 9 in relation to one another can be damped in relation to the region of the crank pin bearing 3, but the flow rate in the direction of the crank pin bearing 3 can be kept small. The throttle bore 29*b* connected in parallel and the check valve 29*a* can be housed in a shared cylindrical body (not shown).

For assembly reasons, first rod part 6 and piston element 7 are embodied from different parts and are fixedly connected to one another via the fastening screws 17.

The thread for the fastening screws 17 is advantageously located in a region of the first rod part 6 which has a sufficiently large cross-sectional area and is therefore located outside the buckle region of the rod part 6. The screw connection has to be dimensioned sufficiently to be able to absorb the mass force.

Figure 14:
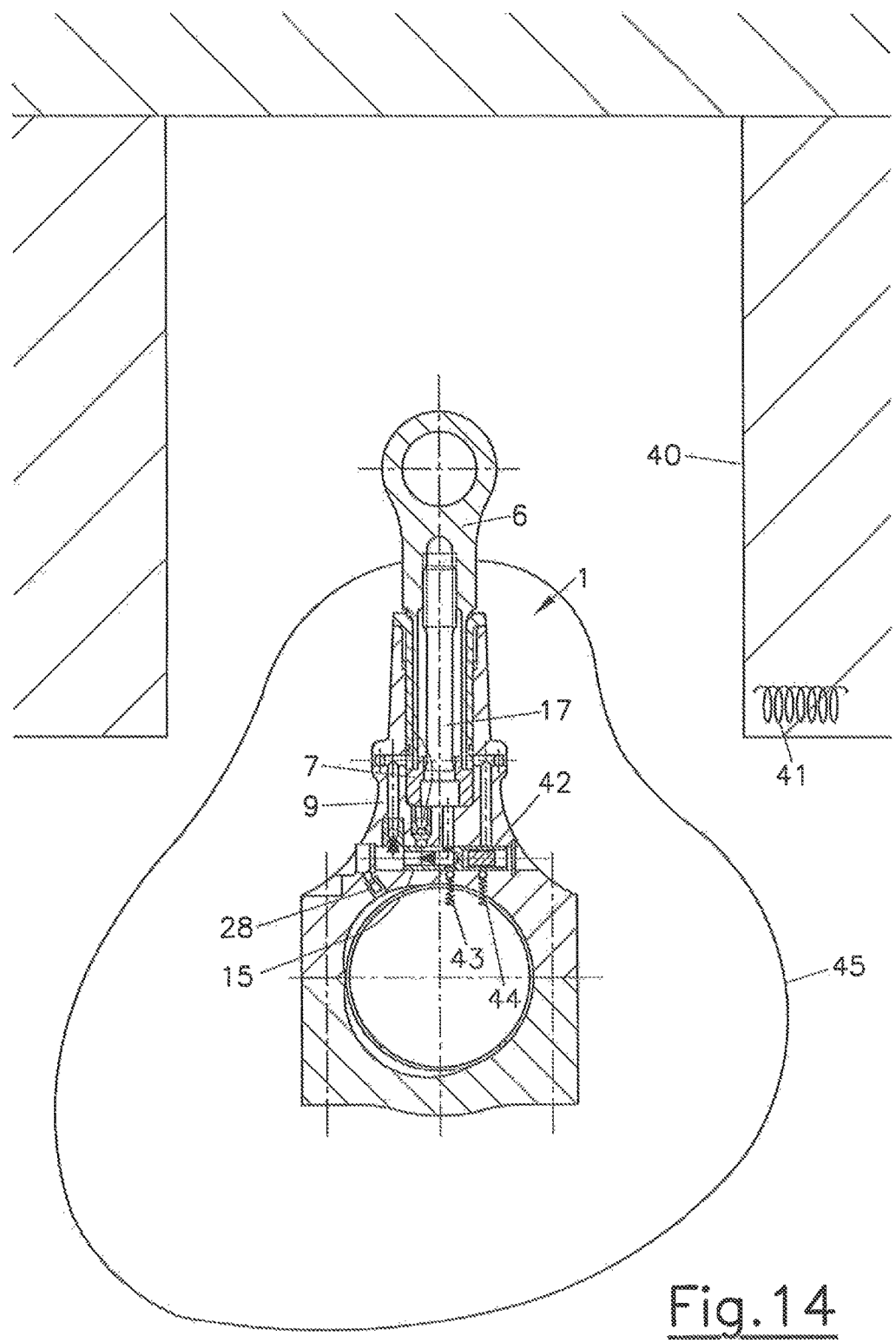
FIG. 14 shows a connecting rod according to the invention in a third embodiment variant.

Alternatively to the actuation by oil pressure against the return force of the return spring 16, the actuation of the control piston 15 can also be performed electromagnetically by an induction coil 41 arranged in the crankcase 40, as schematically shown in FIG. 14. In this case, the control piston 15 can consist of ferromagnetic material or can have a permanent magnet element 42 and can be moved back and forth between two positions, which can be locked by means of locking elements 43, 44, by means of electromagnetic forces. Alternatively thereto, the magnetic control piston 15—as in the first and second embodiment variants shown in FIG. 1 to FIG. 13—can be moved by a return spring 16 into a first position, which corresponds to the extended position A of the first rod part 6, and, against the force of the return spring 16—but now electromagnetically—into a second position, which corresponds to the retracted position B of the first rod part 6. The locking elements 43, 44 can be formed, for example, by spring-loaded pressure bodies, which act on the control piston 15 transversely to the movement direction thereof, wherein the pressure bodies engage in grooves or recesses of the control piston 15 in the locked position. The connecting rod movement space of the connecting rod 1 is indicated with reference sign 45 in FIG. 14.

The invention claimed is:

1. A length-adjustable connecting rod for a reciprocating-piston machine, the length-adjustable connecting rod comprising:
at least one first rod part having a small connecting rod eye and a second rod part having a large connecting rod eye, which first and second rod parts can be moved in relation to each other and/or in each other in a telescopic manner, wherein the second rod part forms a guiding cylinder and the first rod part forms a piston element that can be longitudinally displaced in the guiding cylinder, wherein a first high-pressure chamber is positioned between an end face of the guiding cylinder and a first end face of the piston element facing the large connecting rod eye, into which first high-pressure chamber at least one first oil channel leads, wherein the at least one first oil channel comprises a first check valve that opens in a direction of the first high-pressure chamber, wherein at least a first return channel extends from the first high-pressure chamber, wherein an outflow cross section of said first return channel can be closed by a control valve in a first position and can be opened by the control valve in a second position, wherein when said control valve is in the first position said first return channel is blocked by the control valve such that oil suctioned into the first pressure chamber cannot escape from said first high-pressure chamber,
a second high-pressure chamber positioned between a holding part, which is fixedly connected to the second rod part, and a second end face of the piston element facing towards the small rod eye, wherein at least one second oil channel leads into the second high-pressure chamber,
wherein the piston element is designed as a double acting piston, and wherein the control valve comprises a control piston and actuation of the control piston is performed hydraulically by oil pressure of the reciprocating-piston machine or electromagnetically.

2. The connecting rod according to claim 1, wherein the first position of the control valve is associated with an extended position of the first rod part and the second position of the control valve is associated with a retracted position of the first rod part.

3. The connecting rod according to claim 2, wherein the first rod part can be hydraulically locked relative to the second rod part both in the extended position and also in the retracted position.

4. The connecting rod according to claim 1, wherein a second check valve is arranged in the at least one second oil channel, and the second check valve opens in the direction of the second high-pressure chamber.

5. The connecting rod according to claim 1, wherein the at least one second oil channel and/or a second return channel is/are arranged outside a longitudinal center plane of the connecting rod, which encloses the longitudinal axis of the connecting rod.

6. The connecting rod according to claim 1, wherein a feed cross section to the at least one second oil channel can be closed by the control valve in the first position and can be opened in the second position.

7. The connecting rod according to claim 1, wherein at least one second return channel extends from the second high-pressure chamber, wherein the outflow cross section of said at least one second return channel can be closed by the control valve in the second position and can be opened in the first position, wherein when said control valve is in the second position said at least one second return channel is blocked by the control valve such that oil suctioned into the second pressure chamber cannot escape from said second high-pressure chamber.

8. The connecting rod according to claim 7, wherein only the first and second return channels can be controlled by the control valve.

9. The connecting rod according to claim 1, wherein at least one return flow throttle is arranged in a feed line to the control valve.

10. The connecting rod according to claim 1, wherein the holding part is formed by a replaceable stop sleeve, which protrudes into the guiding cylinder.

11. The connecting rod according to claim 10, wherein the stop sleeve is screwed together with the second rod part.

12. The connecting rod according to claim 1, wherein a feed cross section to the first oil channel can be closed by the control valve in the second position and can be opened in the first position of the control valve.

13. The connecting rod according to claim 1, wherein the actuation of the control piston is performed against a force of a return spring.

14. The connecting rod according to claim 1, wherein the control piston consists of ferromagnetic material or has a permanent magnet element configured to interact with an induction coil arranged in a crankcase of a reciprocating-piston machine.

15. The connecting rod according to claim 1, wherein the control piston can be locked in at least one position by at least one locking element.

16. The connecting rod according to claim 15, wherein the locking element is formed by a spring-loaded pressure part.

17. The connecting rod according to claim 15, wherein the locking element has a spring-loaded pressure body, which acts on the control piston transversely to a movement direction thereof.

18. The connecting rod according to claim 1, wherein the control piston can be axially displaced in an accommodating bore of the second rod part of the connecting rod.

19. The connecting rod according to claim 1, wherein the piston element is designed as a stepped piston.

20. The connecting rod according to claim 1, wherein the control piston can be moved into a first position by means of a return spring and can be moved into a second position against a force of the return spring by means of an actuating force.

\* \* \* \* \*